(12) United States Patent
Yun

(10) Patent No.: US 6,920,005 B2
(45) Date of Patent: Jul. 19, 2005

(54) STORAGE APPARATUS AND READ ERROR RECOVERY METHOD THEREOF

(75) Inventor: Sung-joong Yun, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 10/769,798

(22) Filed: Feb. 3, 2004

(65) Prior Publication Data

US 2004/0156138 A1 Aug. 12, 2004

(30) Foreign Application Priority Data

Feb. 8, 2003 (KR) .................................. 10-2003-0008002

(51) Int. Cl.[7] .............................................. G11B 5/02
(52) U.S. Cl. ........................... 360/53; 360/31; 714/763; 714/769; 714/774
(58) Field of Search ..................... 360/53, 31; 714/763, 714/769, 774

(56) References Cited

U.S. PATENT DOCUMENTS

| | | | | |
|---|---|---|---|---|
| 5,533,031 A | * | 7/1996 | Dounn et al. | 714/718 |
| 5,610,776 A | * | 3/1997 | Oh | 360/53 |
| 6,069,758 A | | 5/2000 | Chung | |
| 6,275,346 B1 | * | 8/2001 | Kim et al. | 360/31 |
| 6,292,450 B1 | * | 9/2001 | Kim | 369/53.35 |

FOREIGN PATENT DOCUMENTS

KR   1998-170566   10/1998

* cited by examiner

Primary Examiner—David Hudspeth
Assistant Examiner—Dismery Mercedes
(74) Attorney, Agent, or Firm—Staas & Halsey LLP

(57) ABSTRACT

A storage apparatus provided with an error recovery procedure (ERP) and a read error recovery method in the storage apparatus. The read error recovery method, in which a plurality of error recovery operations are sequentially performed, includes applying parameters corresponding to each of the error recovery operations; measuring the performance of each error recovery operation; comparing the performance of a current error recovery operation with the performance of a previous error recovery operation; and adding parameters corresponding to the current error recovery operation and parameters corresponding to the previous error recovery operation to parameters corresponding to a subsequent error recovery operation when the performance of the current error recovery operation is better than the performance of the previous error recovery operation, and ignoring the parameters corresponding to the current error recovery step and adding the parameters corresponding to the previous error recovery operation to the parameters corresponding to the subsequent error recovery operation when the performance of the current error recovery operation is not better than the performance of the previous error recovery operation.

23 Claims, 4 Drawing Sheets

FIG. 2 (PRIOR ART)

| OPERATION | PARAMETER | | | |
|---|---|---|---|---|
| | READ GAIN | MR BIAS | OFF-TRACK | ASYMMETRIC CORRECTION |
| 1 | DEFAULT MODE | | | |
| 2 | DEFAULT MODE | | | |
| 3 | 0 | 0 | +15% | 0 |
| 4 | 0 | 0 | −15% | 0 |
| | 8 | 0 | +20% | USE |
| | −8 | 0 | −20% | 0 |
| LAST | 0 | 4 | 0 | 0 |

STORAGE APPARATUS AND READ ERROR RECOVERY METHOD THEREOF

CROSS-REFERENCE TO RELATED APPLICATIONS

This application claims the benefit of Korean Patent Application No. 2003-8002, filed on Feb. 8, 2003, in the Korean Intellectual Property Office, the disclosure of which is incorporated herein by reference.

BACKGROUND OF THE INVENTION

1. Field of the Invention

The present invention relates to a storage apparatus and a read error recovery method of the storage apparatus, and more particularly, to a storage apparatus provided with an error recovery procedure (ERP) including a self diagnostic feature used in a hard disk drive and a read error recovery method thereof.

2. Description of the Related Art

Hard disk drives write or read data to or from a disk surface using magnetic changes in the disk surface. A transducer head is positioned at a predetermined position of a track in which data is recorded and reads information from the track of the disk rotating at a high speed. There exist situations when errors occur while data is being read using the transducer head, thus various conventional ERPs for recovering errors have been disclosed. For example, U.S. Pat. No. 5,533,031 discloses a method of recovering errors in a recording medium drive using an ERP and a data verification method.

When a hard disk drive reads data from a disk, read errors occur due to defects on a disk or misregistration of a track. Registration means determining an accurate position or adjusting a position based on a given reference.

When such errors occur, an ERP is performed, which include error recovery operations such as changing various parameters and re-reading, in order to increase readability. Generally, data errors are recovered using an error correction code (ECC). In cases of a change in read gain, a change in an off-track, and use of magnetic resistance (MR) device as a read head, an error recovery operation changing a bias value of the MR device is performed.

When reading of data succeeds, by performing error recovery and re-reading, the data is continuously used. However, an error that cannot be recovered even through a plurality of error recovery operations is a fatal error. When data can be rewritten or reassigned to an area other than a current area on a disk, the data is rewritten to another area, and the current area is determined as a non-usable area.

FIG. 1 is a flowchart of a conventional read error recovery method, and FIG. 2 is a diagram showing error recovery operations used in the conventional read error recovery method. The conventional read error recovery method will be described with reference to FIGS. 1 and 2.

As illustrated in FIG. 1, an attempt to read data from a disk is made (S10). Thereafter, it is determined whether the data has been read successfully (S12). If it is determined that the data has been read successfully, normal data is output (S14), and the operation ends.

If it is determined that the data has not been read successfully, that is, if an error occurs during the data reading process, an ERP is performed. In the conventional ERP, a parameter set for each error recovery operation in advance is sequentially applied to re-read the data. Accordingly, a predetermined parameter for a current error recovery step is applied (S16).

More specifically, referring to FIG. 2, first and second error recovery operations are performed in a default mode. In the default mode, reading is re-tried without changing parameters. In a third error recovery operation, an off-track parameter is changed to +15%, that is, an off-track offset is set to 15% in a positive direction.

Next, the current error recovery operation is increased by one (S18). It is determined whether the increased current error recovery operation comes after a predetermined last error recovery operation (S20). If it is determined that the current error recovery operation does not come after the last error recovery operation, the operation goes back to operation S10 to re-try data reading.

If re-reading of the data is successfully performed, the normal data is output, and the ERP ends. However, if re-reading of the data is not successfully performed, a parameter set for the current error recovery operation is applied (S16). For example, if the current error recovery operation is a fourth error recovery operation, the off-track parameter is changed to −15%, that is, the off-track offset is set to 15% in a negative direction.

As described above, when data re-reading is not successful with a predetermined parameter corresponding to a current error recovery operation, a predetermined parameter corresponding to a subsequent error recovery operation is applied to the process of re-reading the data. If data reading is performed successfully in a 30th error recovery operation, normal data can be output and automatically reassigned, that is, recorded in an unused area on the disk.

In the meantime, if data reading is not performed successfully after the last error recovery operation, the error is determined as a fatal error (S22), and the ERP ends.

As described above, in the conventional error recovery method, predetermined error recovery operations are sequentially performed regardless of the characteristics or causes of the errors. Accordingly, it is difficult to recover data errors caused by complex factors with the conventional error recovery method. For example, when there are errors in data that can be recovered using an off-track parameter of +20%, a read gain parameter of +8, and an MR bias parameter of +4, the data cannot be read if the conventional error recovery operations do not include such a combination of parameters.

Meanwhile, in large capacity and high performance hard disks, a track density and a spindle motor's revolutions per minute (RPM) increase. Accordingly, the probability of data being off-track during recording or the probability of the occurrence of an ECC error increases.

Therefore, an improved re-try algorithm for data read errors is desired in order to increase the possibility of successfully reading data from a hard disk.

SUMMARY OF THE INVENTION

The present invention provides a read error recovery method in a storage apparatus which improves an error recovery operation to recover data errors caused by complex factors and additionally applies parameters used in the improved error recovery operation in a subsequent error recovery operation.

The present invention also provides a storage apparatus which improves an error recovery operation to recover data errors caused by complex factors and additionally applies parameters used in the improved error recovery operation in a subsequent error recovery step.

According to an aspect of the present invention, there is provided a read error recovery method in which a plurality of error recovery operations are sequentially performed in order to recover an error occurring while data is read from a storage apparatus. The read error recovery method includes applying parameters corresponding to each of the error recovery operations; measuring the performance of each error recovery operation; comparing the performance of a current error recovery operation with a performance of a previous error recovery operation; and adding parameters corresponding to the current error recovery operation and parameters corresponding to the previous error recovery operation to parameters corresponding to a subsequent error recovery operation when the performance of the current error recovery operation is better than the performance of the previous error recovery operation, and ignoring the parameters corresponding to the current error recovery operation and adding the parameters corresponding to the previous error recovery operation to the parameters corresponding to the subsequent error recovery operation when the performance of the current error recovery operation is not better than the performance of the previous error recovery operation.

According to another aspect of the present invention, there is provided a storage apparatus which sequentially performs a plurality of error recovery operations in order to recover an error occurring while data is read from the storage apparatus. The storage apparatus includes an applicator for applying parameters corresponding to each of the error recovery operations; a measurer for measuring the performance of each error recovery operation; a comparator for comparing the performance of a current error recovery operation with the performance of a previous error recovery operation; and an adder for adding parameters corresponding to the current error recovery operation and parameters corresponding to the previous error recovery operation to parameters corresponding to a subsequent error recovery operation when the performance of the current error recovery operation is better than the performance of the previous error recovery operation, and ignoring the parameters corresponding to the current error recovery operation and adding the parameters corresponding to the previous error recovery operation to the parameters corresponding to the subsequent error recovery operation when the performance of the current error recovery operation is not better than the performance of the previous error recovery operation.

According to an aspect of the present invention, the storage apparatus includes a hard disk drive.

According to an aspect of the present invention, the ERP includes a channel statistics measurement (CSM) from which an error state of a currently connected channel can be checked, a small CSM indicates an improvement of the performance of the error recovery operation.

According to an aspect of the present invention, a parameter of the ERP includes an off-track value, i.e., an offset value between a center of a magnetic head and a center of a track.

According to an aspect of the present invention, a parameter of the ERP includes a magnetic resistance (MR) bias value that is a bias current value set for an MR device included in a magnetic head.

According to an aspect of the present invention, a parameter of the ERP includes a gain value used for an automatic gain control (AGC) for maintaining an amplitude of a playback signal constant.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 is a diagram showing error recovery steps used in the conventional read error recovery method;

DETAILED DESCRIPTION OF THE PREFERRED EMBODIMENTS

Figure 1:
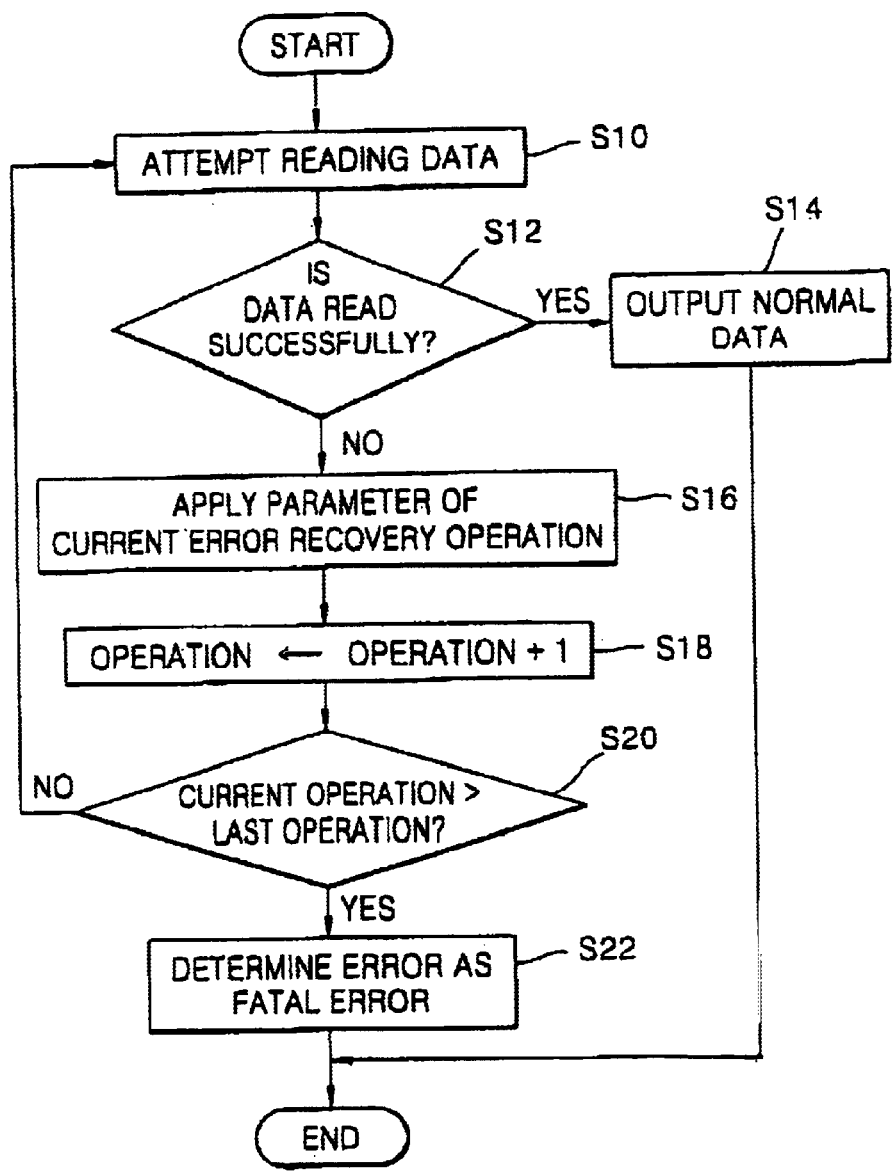
FIG. 1 is a flowchart of a conventional read error recovery method.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
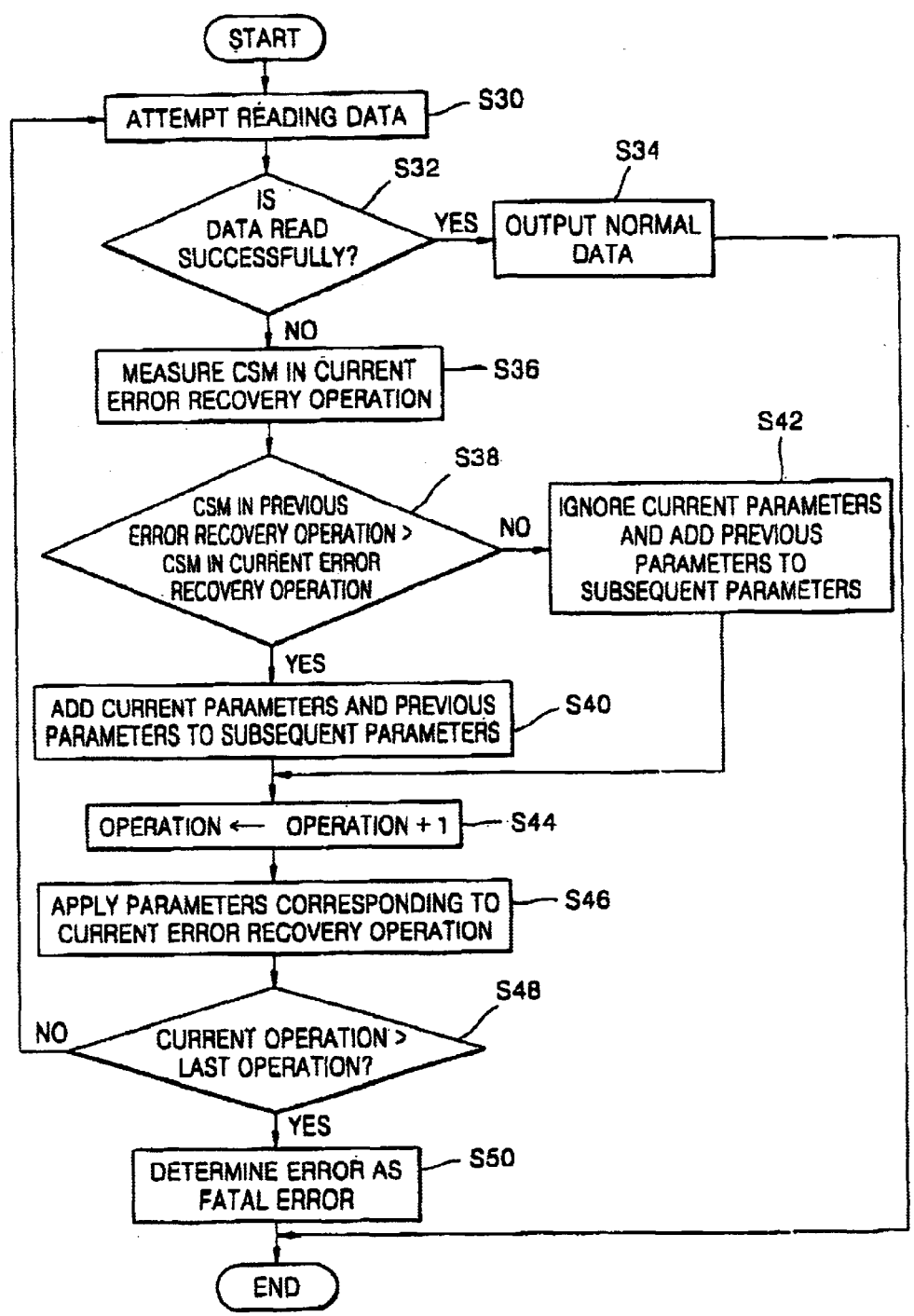
FIG. 3 is a flowchart of a read error recovery method according to an embodiment of the present invention.

FIG. 3 is a flowchart of a read error recovery method according to an embodiment of the present invention. Referring to FIG. 3, an attempt to read data from a disk is made (S30). Thereafter, it is determined whether the data has been read successfully (S32). If it is determined that the data has been read successfully, normal data is output (S34), and the operation ends.

If it is determined that the data has not been read successfully, that is, if an error occurs during the data reading process, an error recovery procedure (ERP) is performed. More specifically, a measure of a current error recovery operation is performed (S36). Preferably, a channel statistics measurement (CSM) from which an error state of a currently connected channel can be checked is performed. A small CSM indicates that a small amount of time will be taken for error recovery. Accordingly, the small CSM indicates an improvement in the error recovery process. Conversely, a large CSM indicates that a large amount of time will be taken for error recovery, and therefore, it indicates poor performance.

In the meantime, the CSM measured in the current error recovery operation is stored in a predetermined storage unit for comparison with a CSM measured in a subsequent error recovery operation.

Next, the CSM measured in the current error recovery operation is compared with a CSM measured in a previous error recovery operation (S38).

When the CSM measured in the current error recovery operation is less than the CSM measured in the previous error recovery operation, that is, when the performance of the current error recovery operation is better than the performance of the previous error recovery operation, parameters corresponding to the current error recovery operation and parameters corresponding to the previous error recovery operation are added to parameters corresponding to the subsequent error recovery operation (S40). In other words, even if data reading with changed parameters fails, it is determined whether use of the changed parameters is better than non-use. If it is determined that use is better than non-use, the changed parameters are kept.

In the meantime, when the CSM measured in the current error recovery operation is not less than the CSM measured in the previous error recovery operation, that is, when the performance of the current error recovery operation is not better than the performance of the previous error recovery operation, the parameters corresponding to the current error recovery operation are ignored, and the parameters corresponding to the previous error recovery operation are added to the parameters corresponding to the subsequent error recovery operation (S42). Since an increase of the CSM indicates an increase of an error recovery time, it is better not to use the parameters corresponding to the current error recovery operation having the increased CSM. Accordingly, only the parameters corresponding to the previous error recovery operation are added to the parameters corresponding to the subsequent error recovery operation.

Next, the current error recovery operation is increased by one (S44). Here, the increased current error recovery operation is the subsequent error recovery operation. Parameters applied in the increased current error recovery operation include the parameters corresponding to the current error recovery operation before being increased and the parameters corresponding to the previous error recovery operation, or include only the parameters corresponding to the previous error recovery operation. The parameters corresponding to the increased current error recovery operation are applied (S46).

Next, it is determined whether the increased current error recovery operation comes after a predetermined last error recovery operation (S48). If it is determined that the increased current error recovery operation does not come after the last error recovery operation, the operation goes back to operation S30, and the data reading process is re-tried.

When the data reading is performed successfully, normal data is output, and the ERP ends. However, when data reading fails, the operation goes to operation S36 to measure a CSM in the current error recovery operation.

Next, operation S38 and the following operations are performed so that additionally applied new parameters in each current error recovery operation are determined to be continuously used in the subsequent error recovery operation based on whether the performance of the current error recovery operation has been improved. Accordingly, as error recovery operations are repeated, readability is increased.

In the meantime, if data reading fails even after the last error recovery operation is performed, an error is determined as a fatal error (S50), and the ERP ends.

Preferably, at least one among an off-track value, an MR bias value, and a read gain value is used as a parameter corresponding to each error recovery operation. The off-track value is an offset value between the center of a magnetic head and the center of a track. The MR bias value is a bias current value set for an MR device included in a magnetic head.

According to the present invention, a complex combination of parameters, for example, a combination of an off-track of +20%, a read gain of +8, and an MR bias of +4, can be used in an error recovery operation. In the conventional error recovery method, this complex combination of parameters is difficult to be predetermined for an error recovery operation. The present invention can increase data readability by using this kind of complex combination of parameters.

Figure 4:
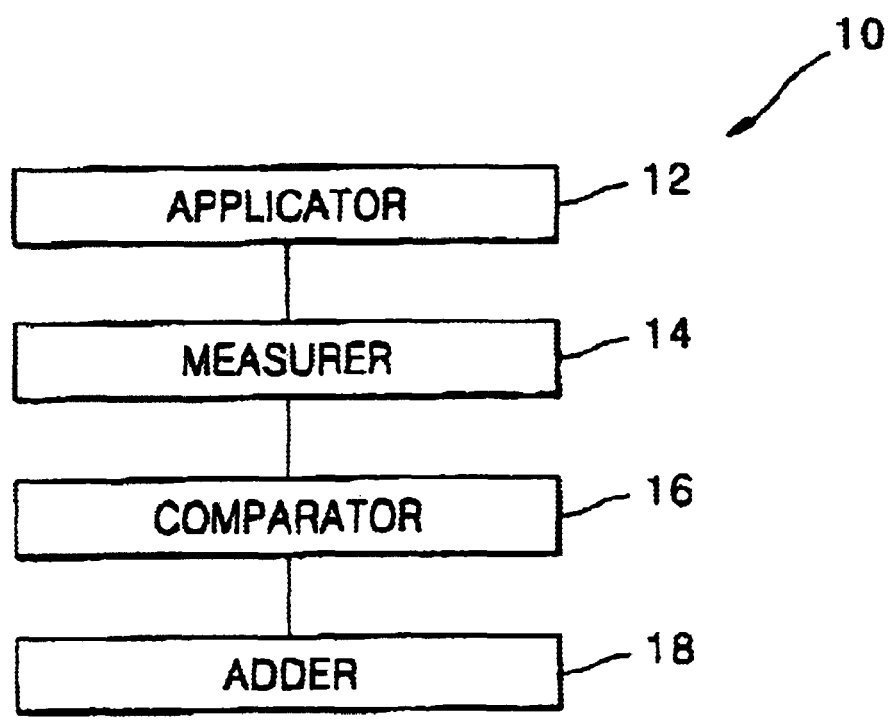
FIG. 4 is a storage apparatus according to an embodiment of the present invention.

FIG. 4 is a storage apparatus according to an embodiment of the present invention.

Preferably, a storage apparatus 10 according to an embodiment of the present invention is a hard disk drive. A hard disk drive according to the embodiment of the present invention sequentially performs a plurality of error recovery operations in order to recover errors occurring when data is read from the hard disk drive. The hard disk drive includes an applicator 12 for applying predetermined parameters in each error recovery operation; a measurer 14 for measuring the performance of each error recovery operation; a comparator 16 for comparing a performance measured in a current error recovery operation with a performance measured in a previous error recovery operation; and an adder 18 for adding parameters corresponding to the current error recovery operation and parameters corresponding to the previous error recovery operation to parameters corresponding to a subsequent error recovery operation when the performance measured in the current error recovery operation is better than that measured in the previous error recovery operation, and ignoring the parameters corresponding to the current error recovery operation and adding the parameters corresponding to the previous error recovery operation to the parameters corresponding to the subsequent error recovery operation when the performance measured in the current error recovery operation is not better than that measured in the previous error recovery operation.

Although the embodiment of the present invention has been described in connection with a hard disk drive, the present invention is not restricted thereto. The present invention can be applied to other recording media drives such as floppy disk drives, optical disk drives, and tape drives. Furthermore, the read error recovery method of the present invention can be stored in a computer in the form of a computer software program.

As described above, according to the present invention, data readability of various storage apparatuses, and more particularly, data readability of hard disk drives can be improved. In addition, reliability of a hard disk drive can be increased, and costs for handling bad sectors in a hard disk can be reduced.

Although a few embodiments of the present invention have been shown and described, it will be appreciated by those skilled in the art that changes may be made in these elements without departing from the spirit and scope of the invention, the scope of which is defined in the appended claims and their equivalents.

What is claimed is:

1. A read error recovery method in which a plurality of error recovery operations are sequentially performed in order to recover an error occurring while data is read from a storage apparatus, the read error recovery method comprising:

applying parameters corresponding to each of the error recovery operations;

measuring the performance of each error recovery operation;

comparing the performance of a current error recovery operation with a performance of a previous error recovery operation; and adding parameters corresponding to the current error recovery operation and parameters corresponding to the previous error recovery operation to parameters corresponding to a subsequent error recovery operation when the performance of the current error recovery operation is better than the performance of the previous error recovery operation, and ignoring the parameters corresponding to the current error recovery operation and adding the parameters corresponding to the previous error recovery operation to the parameters corresponding to the subsequent error recovery operation when the performance of the current error recovery operation is not better than the performance of the previous error recovery operation.

2. The read error recovery method of claim 1, wherein the storage apparatus comprises a hard disk drive.

3. The read error recovery method of claim 1, wherein the performance comprises a channel statistics measurement (CSM) from which an error state of a currently connected channel is checked, wherein a small CSM indicates an improvement of the performance of the error recovery operation.

4. The read error recovery method of claim 1, wherein the parameters comprise an off-track value.

5. The read error recovery method of claim 4, wherein the off-track value includes an offset value between a center of a magnetic head and a center of a track.

6. The read error recovery method of claim 1, wherein the parameters comprise a magnetic resistance (MR) bias value.

7. The read error recovery method of claim 6, wherein the magnetic resistance (MR) bias value is a bias current value set for an MR device included in a magnetic head.

8. The read error recovery method of claim 1, wherein the parameters comprise a gain value used for an automatic gain control (AGC) for maintaining an amplitude of a playback signal constant.

9. A storage apparatus which sequentially performs a plurality of error recovery operations in order to recover an error occurring while data is read from the storage apparatus, the storage apparatus comprising:

means for applying parameters corresponding to each of the error recovery operations;

means for measuring the performance of each error recovery operation;

means for comparing the performance of a current error recovery operation with the performance of a previous error recovery operation; and means for adding parameters corresponding to the current error recovery operation and parameters corresponding to the previous error recovery operation to parameters corresponding to a subsequent error recovery operation when the performance of the current error recovery operation is better than the performance of the previous error recovery operation, and ignoring the parameters corresponding to the current error recovery operation and adding the parameters corresponding to the previous error recovery operation to the parameters corresponding to the subsequent error recovery operation when the performance of the current error recovery operation is not better than the performance of the previous error recovery operation.

10. The storage apparatus of claim 9, wherein the storage apparatus comprises a hard disk drive.

11. The storage apparatus of claim 9, wherein the performance comprises a channel statistics measurement (CSM) from which an error state of a currently connected channel can be checked, wherein a small CSM indicates an improvement of the performance of the error recovery process.

12. The storage apparatus of claim 9, wherein the parameters comprise an off-track value.

13. The storage apparatus of claim 12, wherein the off-track value includes an offset value between a center of a magnetic head and a center of a track.

14. The storage apparatus of claim 9, wherein the parameters comprise a magnetic resistance (MR) bias value that is a bias current value set for an MR device included in a magnetic head.

15. The storage apparatus of claim 9, wherein the parameters comprise a gain value used for an automatic gain control (AGC) for maintaining an amplitude of a playback signal constant.

16. A read error recovery method comprising:

performing an Error Recovery Procedure (ERP) if data read has not been read successfully;

wherein the performance of the ERP comprises performing a Channel Statistics Measurement (CSM) and determining if CSM from a previous ERP is greater or lesser than a current CSM;

wherein if the CSM in the previous ERP is greater than the CSM in the current ERP, adding current parameters and previous parameters to subsequent parameters, and increasing current error recovery by one, and if the CSM in the previous ERP is less than the CSM in the current ERP, ignoring the current parameters and adding previous parameters to subsequent parameters.

17. The read error recovery method of claim 16, wherein the parameters comprise an off-track value.

18. The read error recovery method of claim 17, wherein the off-track value includes an offset value between a center of a magnetic head and a center of a track.

19. The read error recovery method according to claim 16, wherein the parameters comprise a magnetic resistance (MR) bias value.

20. The read error recovery method according to claim 19, wherein the MR bias value is a bias current value set for an MR device included in a magnetic head.

21. The read error recovery method according to claim 1, wherein the method is stored in a computer in form of a computer software language.

22. The storage apparatus according to claim 12, wherein the error recovery operations are stored in a computer if form of a computer software language.

23. The read error recovery method according to claim 16, wherein the read error recovery method is stored in a computer in form of a computer software language.

* * * * *